United States Patent
Bestgen et al.

(10) Patent No.: US 8,332,389 B2
(45) Date of Patent: *Dec. 11, 2012

(54) JOIN ORDER FOR A DATABASE QUERY

(75) Inventors: Robert J. Bestgen, Rochester, MN (US); Robert V. Downer, Rochester, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 552 days.

This patent is subject to a terminal disclaimer.

(21) Appl. No.: 12/630,950

(22) Filed: Dec. 4, 2009

(65) Prior Publication Data

US 2011/0137890 A1   Jun. 9, 2011

(51) Int. Cl.
G06F 17/30 (2006.01)
(52) U.S. Cl. ......... 707/719; 707/714; 707/718; 707/720
(58) Field of Classification Search .......... None
See application file for complete search history.

(56) References Cited

U.S. PATENT DOCUMENTS

| 5,345,585 | A | 9/1994 | Iyer et al. |
| 6,757,670 | B1 | 6/2004 | Inohara et al. |
| 7,167,852 | B1 * | 1/2007 | Ahmed et al. ............. 707/714 |
| 7,321,888 | B2 | 1/2008 | Day et al. |
| 7,739,269 | B2 | 6/2010 | Chaudhuri |
| 2009/0094192 | A1 | 4/2009 | Bestgen |
| 2011/0055199 | A1 * | 3/2011 | Siddiqui et al. ............ 707/714 |

* cited by examiner

*Primary Examiner* — Anteneh Girma
(74) *Attorney, Agent, or Firm* — Owen J. Gamon

(57) ABSTRACT

In an embodiment, a portion of the execution plan is executed to produce a portion of records in a partial result set. If a first join of a table is performed that eliminates more than a first threshold number of records from the partial result set, a determination is made whether an estimated cost of a forced primary join is less than an estimated cost of a star join. If the estimated cost of the forced primary join is less than the estimated cost of the star join, then the table is moved first in a join order in the execution plan, the portion of the records in the partial result set is discarded, and the execution is restarted with a different portion of the execution plan to produce a different portion of the records.

17 Claims, 10 Drawing Sheets

JOIN ORDER FOR A DATABASE QUERY

FIELD

An embodiment of the invention generally relates to database management systems, and in particular, to the order of joins of data utilized in such systems.

BACKGROUND

Computer systems typically comprise a combination of hardware, such as semiconductors and circuit boards, and computer programs. Fundamentally, computer systems are used for the storage, manipulation, and analysis of data, and the overall value or worth of a computer system depends largely upon how well the computer system stores, manipulates, and analyzes data. One mechanism for managing data is called a database management system (DBMS), which may also be called a database system or simply a database.

Many different types of databases are known, but the most common is usually called a relational database (RDB), which organizes data in tables that have rows, which represent individual entries, tuples, or records in the database, and columns, fields, or attributes, which define what is stored in each entry, tuple, or record. Each table has a unique name within the database and each column has a unique name within the particular table. The database also has an index, which is a data structure that informs the database management system of the location of a certain row in a table given an indexed column value, analogous to a book index informing the reader on which page a given word appears.

To be useful, the data stored in databases must be capable of being retrieved in an efficient manner. The most common way to retrieve data from a database is through statements called database queries, which may originate from user interfaces, application programs, or remote computer systems, such as clients or peers. A query is an expression evaluated by the database management system, in order to retrieve data from the database that satisfies or meets the criteria or conditions specified in the query. Although the query requires the return of a particular data set in response, the method of query execution is typically not specified by the query. Thus, after the database management system receives a query, the database management system interprets the query and determines what internal steps are necessary to satisfy the query. These internal steps may comprise an identification of the table or tables specified in the query, the row or rows selected in the query, and other information such as whether to use an existing index, whether to build a temporary index, whether to use a temporary file to execute a sort, and/or the order in which the tables are to be joined together to satisfy the query.

When taken together, these internal steps are referred to as an execution plan, a query plan, or just a plan. The execution plan is typically depicted as a tree graph and is typically created by a component of the database management system that is often called a query optimizer. The query optimizer may be part of the database management system or separate from, but in communication with, the database management system. When a query optimizer creates an execution plan for a given query, the execution plan is often saved by the database management system in the program object, e.g., the application program, that requested the query. The execution plan may also be saved in an SQL (Structured Query Language) package or an execution plan cache. Then, when the user or program object repeats the query, which is a common occurrence, the database management system can find and reutilize the associated saved execution plan instead of undergoing the expensive and time-consuming process of recreating the execution plan. Thus, reusing execution plans increases the performance of queries when performed by the database management system.

Many different execution plans may be created for any one query, each of which would return the same data set that satisfies the query, yet the different execution plans may provide widely different performance. Thus, the execution plan selected by the database management system needs to provide the required data at a reasonable cost in terms of time and hardware resources. Hence, the query optimizer often creates multiple prospective execution plans and then chooses the best, fastest, or least expensive one, to execute.

One factor that contributes to the cost of a particular execution plan is the number of rows or tuples that the execution plan, when executed, returns from the database tables. One important aspect that influences the number of tuples returned is the join order of the tables. In response to a query that requests data from multiple tables, tuples from these multiple tables are joined (the tuples are often concatenated horizontally in a result set), in order to find and retrieve the data from all the tables. Thus, a join operation is a relationship between two tables accessed by a query (a join query), and a join operation is performed to connect (or join) data from two or more tables, wherein tuples with matching attributes are joined together to form a new tuple. The join order is typically specified by the execution plan and is the order in which the database management system performs join operations when the database management system executes the query via the execution plan to retrieve and join rows of data from the database tables into the result set.

Join operations are typically implemented using a nested loop algorithm, where the resultant new tuples from the first two tables in the join order are joined to the resultant tuples from the third table, and those results are joined to the fourth table, etc. Eventually all of the needed join operations are complete, and the resultant new tuples are the result set that satisfies the query.

Because a single join is limited to accessing two tables, multi-table joins are performed in sequence according to a particular order. Many different join queries may be implemented by joining the tables in any of several possible join orders. For example, a query that involves joining tables A, B, and C can often be performed as a join of table A and B followed by a join of table A and C. Alternatively, in many instances, the same query can be performed as a join of table A and C followed by the join of table A and B. The query optimizer attempts to select a join order that will eliminate the greatest number of records from the potential result set early in the join processing, which saves the costs associated with repeatedly accessing tables later in the join operation.

Conventional query optimizers evaluate certain characteristics about the tables A, B, and C, in an attempt to determine the best join order for the query. In particular, during runtime, one join operation may have a high fan-out rate in which each record of table A matches multiple records in table B. If this join is performed first, then each of these matching records will need to be joined to table C, thereby requiring a significant number of intermediate operations. Conversely, the other join operation may have a high fan-in rate in which each record of table A matches very few or zero records in table C. If this join operation is performed first, then only a few records need to be joined with table B, thereby saving a number of intermediate operations.

SUMMARY

A method, storage medium, and computer system are provided. In an embodiment, a portion of the execution plan is executed to produce a portion of records in a partial result set. If a first join of a table is performed that eliminates more than a first threshold number of records from the partial result set, a determination is made whether an estimated cost of a forced primary join is less than an estimated cost of a star join. If the estimated cost of the forced primary join is less than the estimated cost of the star join, then the table is moved first in a join order in the execution plan, the portion of the records in the partial result set is discarded, and the execution is restarted with a different portion of the execution plan to produce a different portion of the records.

BRIEF DESCRIPTION OF THE SEVERAL VIEWS OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
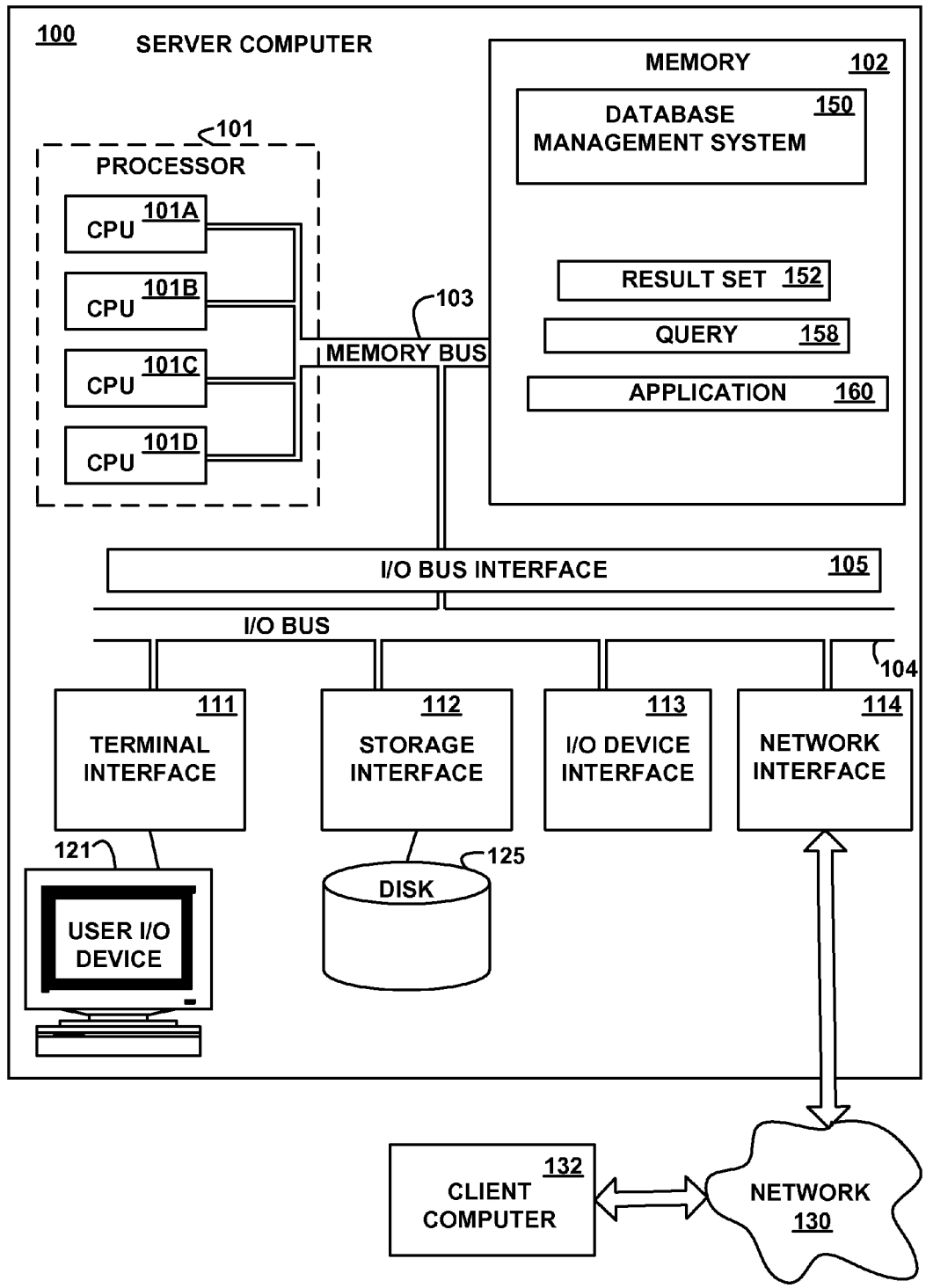
FIG. 1 depicts a high-level of a system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

The main memory 102 is a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a database management system 150, a result set 152, a query 158, and an application 160. Although the database management system 150, the result set 152, the query 158, and the application 160 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the database management system 150, the result set 152, the query 158, and the application 160 are illustrated as being contained within the main memory 102, these elements are not necessarily all completely contained in the same storage device at the same time. Further, although the database management system 150, the result set 152, the query 158, and the application 160 are illustrated as being separate entities, in other embodiments some of them, portions of some of them, or all of them may be packaged together.

The application 160 sends the query command 158 to the database management system 150, which requests that the database management system 150 search for or find a row or combination of rows of data and store the data from those found rows into the result set 152 that meet or satisfy the criteria, keys, and or values specified by the query command 158. In an embodiment, the application 160 sends the same query command 158 multiple times to the database management system 150, which may or may not result in a different result set 152, depending on whether the data in the database management system 150 has changed between occurrences of the query 158. The database management system 150 receives the query 158 from the application 160 and, in response, creates or stores data from a data into the result set 152 that satisfies or meets the search criteria specified by the query 158.

In an embodiment, the database management system 150 and/or the application 160 comprise instructions or statements that execute on the processor 101 or instructions or statements that are interpreted by instructions or statements that execute on the processor 101, to carry out the functions as further described below with reference to FIGS. 8, 9, and 10. In another embodiment, the database management system 150 and/or the application 160 are implemented in hardware via semiconductor devices, chips, logical gates, circuits, circuit cards, and/or other physical hardware devices in lieu of, or in addition to, a processor-based system. In an embodiment, the database management system 150 and/or the application 160 comprise data in addition to instructions or statements. In various embodiments, the application 160 is a user application, a third-party application, an operating system, or any portion, multiple, or combination thereof.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user terminals 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user terminal 121 and the computer system 100, and may receive output data via the user output devices. For example, a user interface may be presented via the user terminal 121, such as displayed on a display device, played via a speaker, or printed via a printer.

The storage interface unit 112 supports the attachment of one or more disk drives or direct access storage devices (DASD) 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed.

The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol).

In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

It should be understood that FIG. 1 is intended to depict the representative major components of the computer system 100, the network 130, and the computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100, and that, when read and executed by one or more processors in the computer system 100 or when interpreted by instructions that are executed by one or more processors, cause the computer system 100 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc that are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the disk 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one ore more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
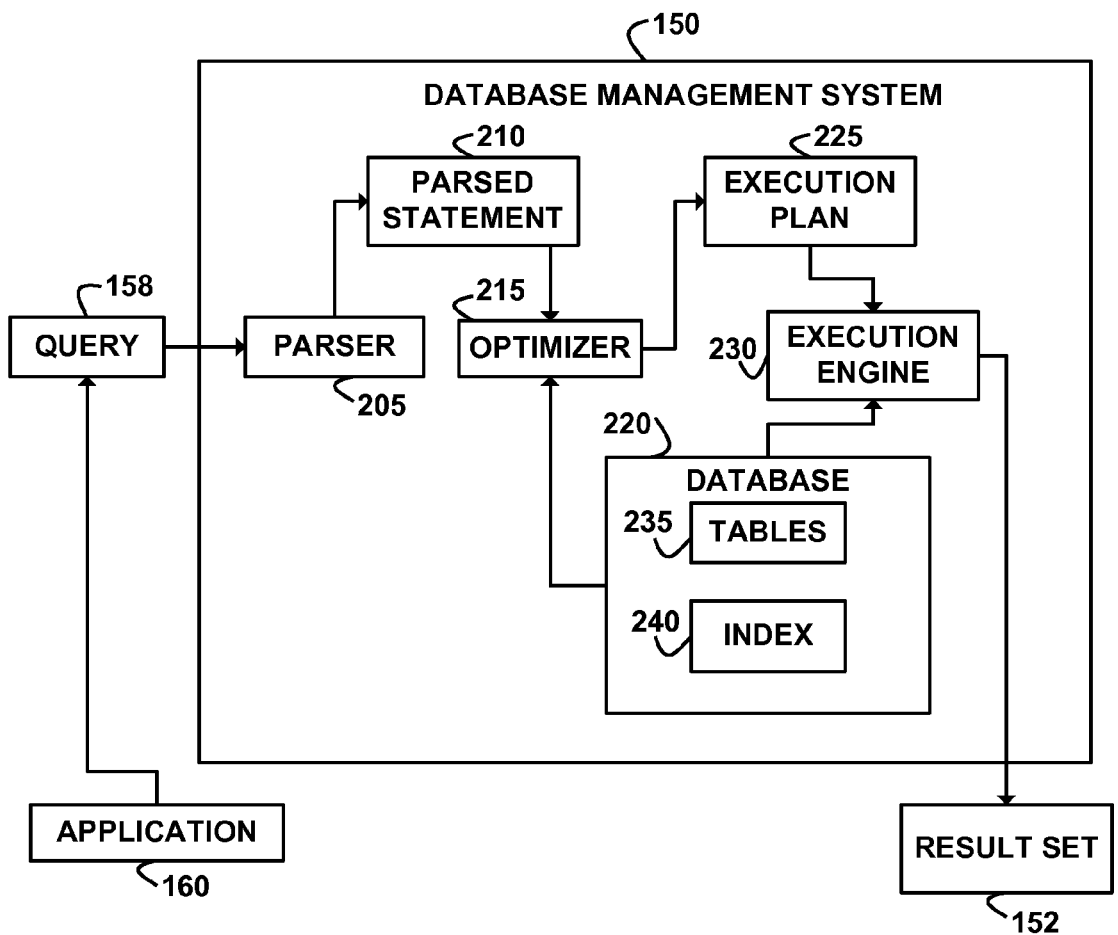
FIG. 2 depicts a block diagram of an example database management system, according to an embodiment of the invention.

FIG. 2 depicts a block diagram of an example database management system, according to an embodiment of the invention. The database management system 150 comprises a parser 205, an optimizer 215, an execution engine 230 and a database 220. The parser 205 receives the query 158 from the application 160. The parser 205 generates a parsed statement 210 therefrom, which the parser 205 sends to the optimizer 215. The optimizer 215 performs query optimization on the parsed statement 210. As a result of query optimization, the optimizer generates the execution plan 225, using data such as platform capabilities, query content information, etc., that is stored in the database 220. Once generated, the optimizer 215 sends the execution plan 225 to the execution engine 230, which executes the database query using the execution plan 225 and the index 240, in order to find and retrieve the data in the database tables 235 in the database 220 that satisfies the criteria of the query. The execution engine 230 stores the resultant data that satisfies the criteria specified by the database query into the result set 152, which is returned to the application 160 as a response to the query 158.

The database tables 235 organizes data in rows, which represent individual entries, tuples, or records in the database, and columns, fields, or attributes, which define what is stored in each entry, tuple, or record. Each table 235 has a unique name within the database and each column has a unique name within the particular table. The database also has an index 240, which is a data structure that informs the database management system 150 of the location of a certain row in a table 235 given an indexed column value.

Figure 3:
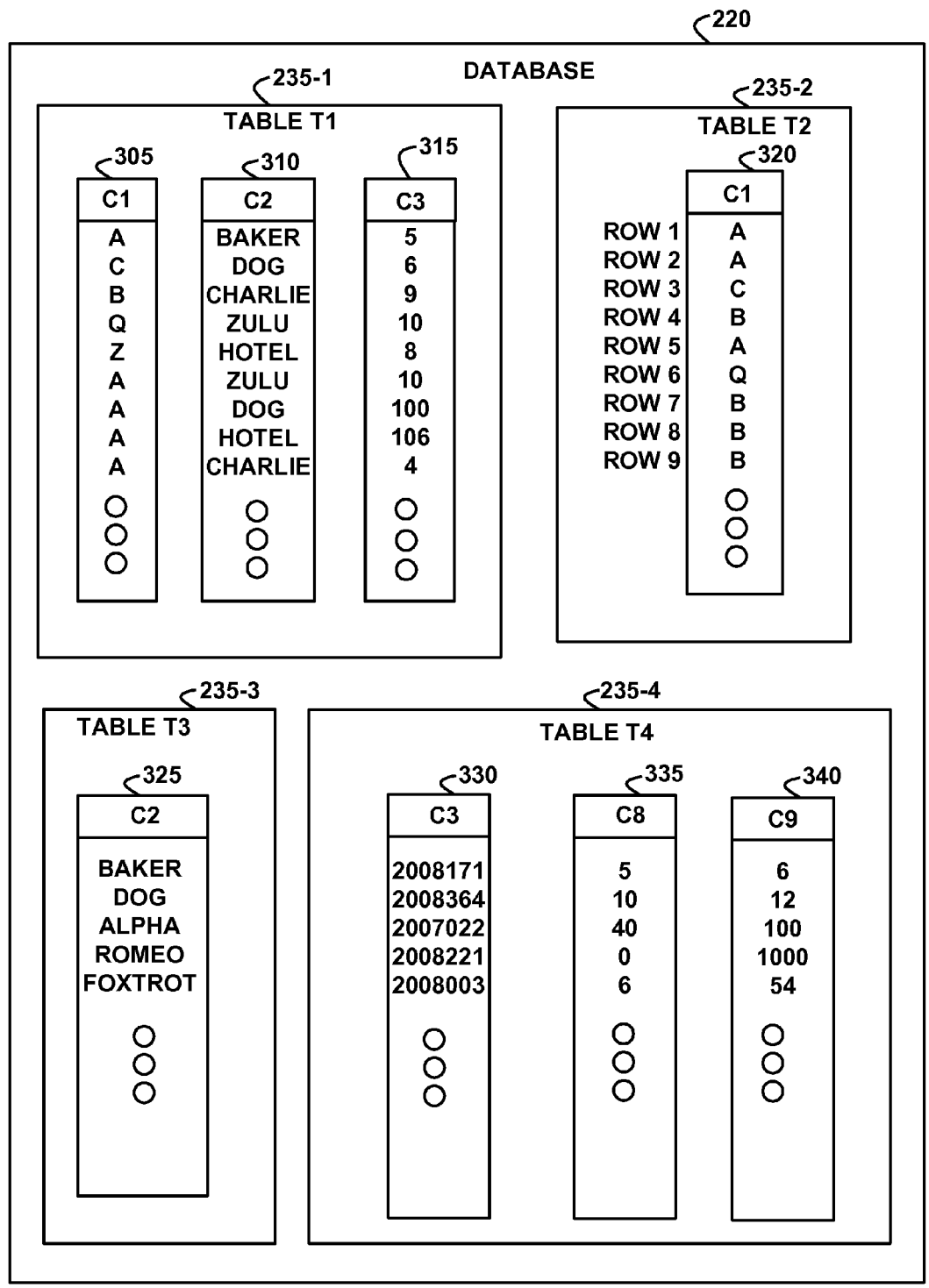
FIG. 3 depicts a block diagram of an example data structure for a database, according to an embodiment of the invention.

FIG. 3 depicts a block diagram of an example data structure for a database 220 with example data, according to an embodiment of the invention. The example database comprises example tables t1 235-1, t2 235-2, t3 235-3, and t4 235-4.

The tables are organized into rows, each of which represent individual entries, tuples, or records in the database, and columns, keys, fields, or attributes that define the organization or structure of the data values that are stored in each row, entry, tuple, or record. Each data table has a unique name within the database and each column has a unique name within the particular table.

The table 235-1 comprises columns c1 305, c2 310, and c3 315. The table t2 235-2 comprises the column c1 320. The table 235-3 comprises the column c2 325. The table 235-4 comprises the columns c3 330, c8 335, and c9 340. Columns 305 and 320 share the same column name or identifier "c1," columns 310 and 325 share the same column name or identifier "c2," and columns 315 and 330 share the same column name or identifier "c3."

Thus, the columns are uniquely identified herein using the notation t1.c1 (referring to column 305 in table 235-1), t1.c2 (referring to column 310 in table 235-1), t1.c3 (referring to column 315 in table 235-1), t2.c1 (referring to column 320 in table 235-2), t3.c2 (referring to column 325 in table 235-3), t4.c3 (referring to column 330 in table 235-4), t4.c8 (referring to column 335 in table 235-4), and t4.c9 (referring to column 340 in table 235-4).

Thus, each table in the example database 220 is divided into rows (or tuples) and columns. For example, the table T1 235-1 comprises a first row of (A, BAKER, 5) with "A" stored in the column c1 305, "BAKER" stored in the column c2 310, and "5" stored in the column c3 315; a second row of (C, DOG, 6) with "C" stored in the column c1 305, "DOG" stored in the column c2 310 and "6" stored in the column c3 315; a third row of (B, CHARLIE, 9) with "B" stored in the column c1 305, "CHARLIE" stored in the column c2 310 and "9" stored in the column c3 315; a fourth row of (Q, ZULU, 10) with "Q" stored in the column c1 305, "ZULU" stored in the column c2 310 and "10" stored in the column c3 315; a fifth row of (Z, HOTEL, 8) with "Z" stored in the column c1 305, "HOTEL" stored in the column c2 310 and "8" stored in the column c3 315; a sixth row of (A, ZULU, 10) with "A" stored in the column c1 305, "ZULU" stored in the column c2 310, and "10" stored in the column c3 315; a seventh row of (A, DOG, 100) with "A" stored in the column c1 305, "DOG" stored in the column c2 310, and "100" stored in the column c3 315; an eighth row of (A, HOTEL, 106) with "A" stored in the column c1 305, "HOTEL" stored in the column c2 310, and "106" stored in the column c3 315; and a ninth row of (A, CHARLIE, 4) with "A" stored in the column c1 305, "CHARLIE" stored in the column c2 310, and "4" stored in the column c3 315, etc.

As another example, the table T2 235-2 comprises a first row of (A) stored in the column c1 320, a second row of (A) stored in the column c1 320, a third row of (C) stored in the column c1 320; a fourth row of (B) stored in the column c1 320; a fifth row of (A) stored in the column c1 320; a sixth row of (Q) stored in the column C1 320; a seventh row of (B) stored in the column C1 320; an eighth row of (B) stored in the column C1 320; and a ninth row of (B) stored in the column C1 320, etc. The Table T2 235-2 illustrated row identifiers ("row 1," "row 2," etc.), which identify the respective rows in the table. In another embodiment, the row identifiers are addresses (either absolute, relative, physical, logical, or virtual addresses) that identify the storage location of the respective row. In an embodiment, the row identifiers are pointed to by addresses or identifiers in the index 240. Although only the table 235-2 explicitly illustrates the row identifiers, they exist for all of the tables and rows.

As another example, the table T3 235-3 comprises a first row of (BAKER) stored in the column c2 325, a second row of (DOG) stored in the column c2 325, a third row of (ALPHA) stored in the column C2 325; a fourth row of (ROMEO) stored in the column c2 325; a fifth row of (FOXTROT) stored in the column c2 325, etc.

As another example, the table T4 235-4 comprises a first row of (2008171, 5, 6) with "2008171" stored in the column c3 330, "5" stored in the column c8 335, and "6" stored in the column c9 340; a second row of (2008364, 10, 12) with "2008364" stored in the column c3 330, "10" stored in the column c8 335, and "12" stored in the column c9 340; a third row of (2007022, 40, 100) with "2007022" stored in the column c3 330, "40" stored in the column c8 335, and "100"

stored in the column c9 340; a fourth row of (2008221, 0, 1000) with "2008221" stored in the column c3 330, "0" stored in the column c8 335, and "1000" stored in the column c9 340; a fifth row of (2008003, 6, 54) with "2008003" stored in the column c3 330, "6" stored in the column c8 335, and "54" stored in the column c9 340; etc.

Figure 4:
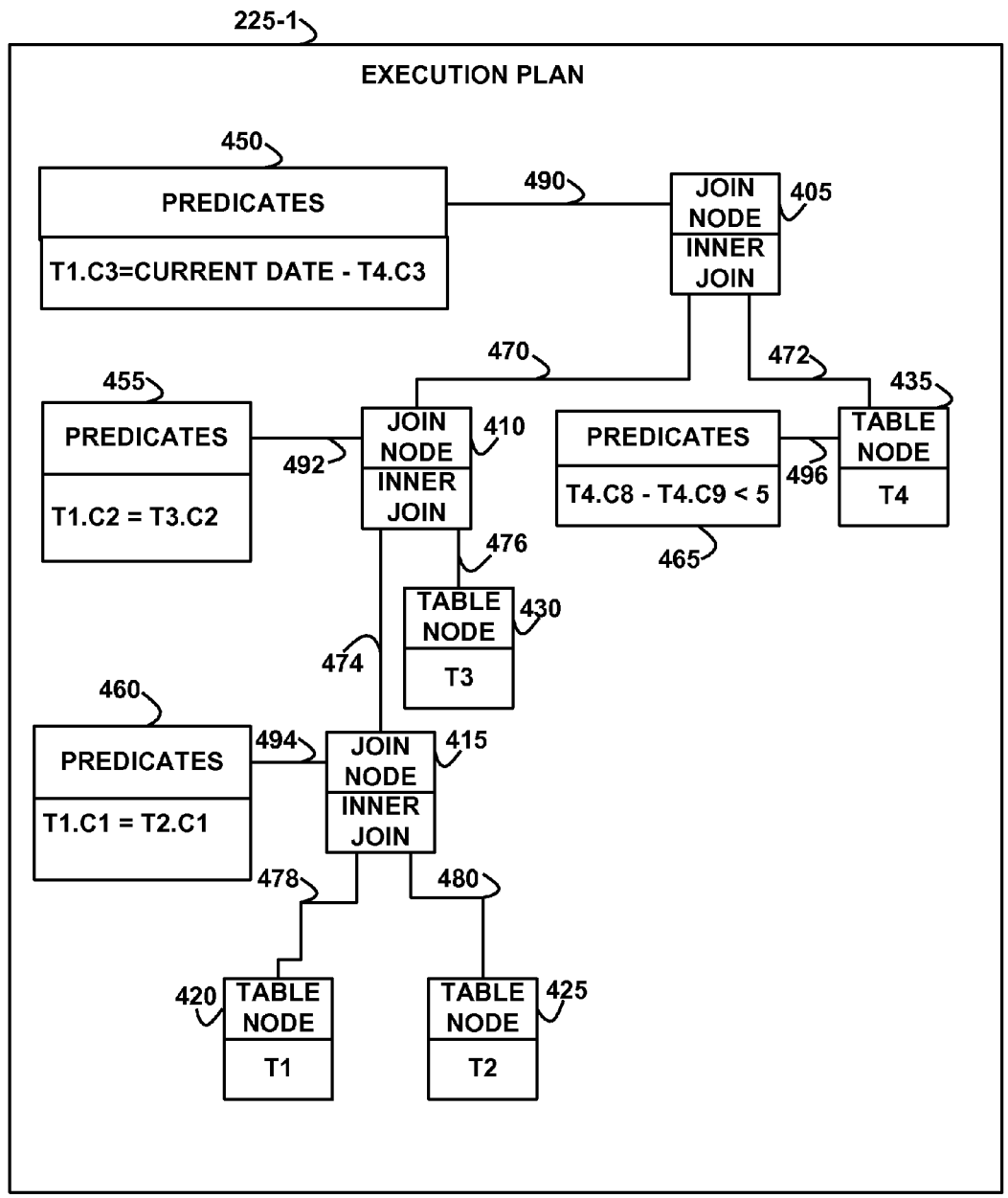
FIG. 4 depicts a block diagram of an example execution plan for a first query implemented with an original join order, according to an embodiment of the invention.

FIG. 4 depicts a block diagram of an example execution plan 225-1 that implements a query using an original join order, according to an embodiment of the invention. In an embodiment, the execution plan 225-1 comprises a tree graph, which is a data structure that represents the join operations that implement the query. The tree graph of the execution plan 225-1 comprises join nodes 405, 410, and 415; table nodes 420, 425, 430, and 435; predicates 450, 455, 460, and 465; links 470, 472, 474, 476, 478, and 480; and links 490, 492, 494, and 496. The table node 420 represents the table 235-1. The table node 425 represents the table 235-2. The table node 430 represents the table 235-3. The table node 435 represents the table 235-4.

A tree graph takes its name from an analogy to trees in nature, which have a hierarchical organization of branches and leaves. For example, a leaf is connected to a small branch, which further is connected to a large branch, and all branches of the tree have a common starting point at the root. Analogously, the nodes 405, 410, 415, 420, 425, 430, and 435 in the tree graph of the execution plan 225 have a hierarchical organization, in that the join node 405 has a relationship with another join node 410, which itself may have a further relationship with another node, and so on. Thus, the nodes may be divided into groups and sub-groups, which ultimately all have a relationship to the root or head node 405.

To define a tree more formally, a tree data structure defines the hierarchical organization of nodes. Hence, a tree is a finite set, T, of one or more of nodes, such that a) one specially designated node is called the root of the entire tree; and b) the remaining nodes (excluding the root) are partitioned into m>=0 disjoint sets T1, . . . Tm, and each of these sets is in turn a tree.

The trees T1, . . . , Tm are called the subtrees of the root. Thus, every node in a tree is the root of some subtree contained in the whole tree. The number of subtrees of a node is called the degree of that node. A node of degree zero is called a terminal compute node or a leaf. A non-terminal node is called a branch node. The level of a node with respect to T is defined by saying that the root node has level 0, and other nodes have a level that is one higher than they have with respect to the subtree that contains them. Each root is the parent of the roots of its subtrees, the latter are siblings, and they are also the children of their parent. Each root is an ancestor of all of the nodes in all of the root's subtrees. The nodes in the subtrees of a root node are the root's descendants. The root node of the entire tree has no parent node.

Thus, using the example tree of the execution plan 225-1 of FIG. 4, the root node is the node 405. The root node 405 is the parent of its child nodes 410 and 435. The node 410 is the parent of its child nodes 415 and 430. The node 415 is the parent of its child nodes 420 and 425. The nodes 420, 425, 430 and 435 have no child nodes, so they are leaf nodes.

The ancestors of the node 420 are the nodes 415, 410, and 405. The ancestors of the node 415 are the nodes 410 and 405. The ancestor of the node 410 is the node 405. The ancestors of the node 425 are the nodes 415, 410, and 405. The ancestors of the node 430 are the nodes 410 and 405. The ancestor of the node 435 is the node 405. The root node 405 has no ancestors.

The links 470, 472, 474, 476, 478, and 480 each connect, point to, or contain the address of two adjacent nodes, and allow the database management system 150 to find the child nodes of a parent node and find the parent node of a child node. The links 490, 492, 494, and 496 each connect, point to, or contain the address of a predicate, and allow the database management system 150 to find the predicate of a node.

In this example, the example query that the example execution plan 225-1 implements may be expressed as: "select*from t1, t2, t3, t4 where t1.c1=t2.c1 and t1.c2=t3.c2 and t1.c3=current date−t4.c3 and t4.c8=t4.c9<5." The tree graph of the execution plan 225-1 illustrates one example implementation and one example join order for the example query, but other implementations and join orders for this query also exist, including embodiments that do not use a tree and that do not use a graph.

Each of the predicates 450, 455, 460, and 465 is associated with or connected to one of the nodes. The predicates each represent a portion of the query and comprise respective conditional criteria expressions, which the database management system 150 evaluates to either true or false by substituting data from the records retrieved from the table nodes (that are connected to the predicate or that are the child node of a join node that is connected to the predicate) into variables in the expression that match column identifiers in the records.

In various embodiments, the predicates specify any multiple, and/or combination of: data; columns, fields, or keys; functions, calls, invocations, methods, classes, or applets; relational operators (e.g., greater than, less than, equal to, not equal to, greater than or equal to, less than or equal to, or any other relational operator); logical operators (e.g., AND, OR, XOR, NOT, NOR, NAND, or any other logical operator); arithmetic operators (e.g., multiplication, division, addition, subtraction, bases, powers, logarithms, or any other arithmetic operators); and register operations (e.g., shift left, shift right operations, or any other register operation); and the relational operators, the logical operators, the arithmetic operators, and the register operations may have any number of arguments or operands (e.g., they may be unary, binary, ternary, or n-ary).

The database management system 150 reads a join node, and in response, reads a record from a table node or nodes, substitutes the data from the columns in the record that have the same table and column identifier as specified in the predicate that is connected to the join node, and evaluates the resultant predicate expression to either true or false. If the predicate expression evaluates to true, then the read record satisfies or meets the connected predicate, so the database management system 150 saves the record to the result set 152. If the predicate expression evaluates to false, then read record does not satisfy or meet the predicate, so the database management system 150 excludes the read record from the result set 152.

The join nodes represents join operations of tables whose records satisfy the connected predicate. In various embodiments, the join operations may comprise inner joins, equi-joins, natural joins, outer joins, left outer joins, right outer joins, full outer joins, exception joins, and self joins. An inner join between two tables results in only the tuples matching certain selection criteria to be returned in the result set 152. An outer join, such as a left join of table A and table B (according to a set of selection criteria) returns all matching records as well as those records in table A not having a match in table B. The matching records have the values of all their fields populated by the data from table A and table B. But, the non-matching records from table A will have a null value, or other default character, in the fields from table B. Another outer join, such as a right join of table A and table B, also returns all the matching records but, unlike the left join, returns those records in table B not having a matching record in table A. An exception join of table A and table B returns a result set of those records in table A for which no matching record in table B exists. A left join and a left outer join are equivalent terms, a right join and a right outer join are equivalent term, and an inner join and an equi-join are equivalent terms.

The join node 415 represents a join operation of the tables represented by the child table nodes 420 and 425 using the connected predicates 460. The join node 410 represents a join operation of the tables represented by the child table node 430 and an intermediate result set created by the child join node 415 using the predicates 455. The join node 405 represents a join operation of the table represented by the child table node 435 and an intermediate result set created by the child join node 410, using the predicates 450 and 465. In an embodiment, the join nodes represent logic in the database management system 150 that performs the join operation that finds rows in the child table nodes, whose column values satisfy the criteria of the predicates when the logic of the join node substitutes the column values of the found rows into the placeholders or variables in the predicates that have the same name or identifier as the column identifiers in the rows.

In operation, the database management system 150 executes the query using the execution plan 225-1 as follows. The database management system 150 begins traversing the nodes at the root or head node and encounters (reads) the head node 405 (the join node 405). Since the join node 405 is not a table node, the database management system 150 travels to left child join node 410 of the join node 405 via the link 470, in search of a first record. The database management system 150 encounters (reads) the join node 410. Since the join node 410 is not a table node, the database management system 150 again travels to the left child node 415 of the node 410 via the link 474, in search of a first record. The database management system 150 encounters the join node 415. Since the join node 415 is not a table node, the database management system 150 again travels to the left child node 420 of the node 415 via the link 478, in search of a first record. The database management system 150 encounters the table node 420 and retrieves the first record from the table represented by the table node 420, using a scan operation. In a scan operation, the database management system 150 reads records from the beginning to the end of a table, without using the index 240 to randomly access the table.

The database management system 150 then travels to the right child node 425 of the node 415, encounters (reads) the table node 425 and searches for a second record in the table identified by the table node 425 that satisfies the selection criteria of the connected predicate 460 of the join node 415. If the database management system 150 does not find a second record in the table identified by the table node 425 that satisfies the selection criteria of the connected predicate 460 of the join node 415, then the database management system 150 returns to the table node 420 and scans the table for the next record and returns to the table node 425 and once again searches for a second record in the table identified by the table node 425 that satisfies the selection criteria of the predicate 460 of the join node 415.

Once a matching record in the table identified by the table node 425 is identified that satisfies the selection criteria of the predicate 460, the database management system 150 returns the found first record (read in a scan operation from the table represented by the node 420) and second record (read from the table node 425) in an intermediate result set to the join node 410. The database management system 150 then travels to the right child table node 430 and searches for a third record in the table t3 identified by the table node 430 that satisfies or meets the predicates 455. Notice that, in determining whether or not a record in the table T3 satisfies the predicates 455, the database management system 150 uses the first record that was found in the table node t1 and was returned in the intermediate result set, in order to compare t1.c2=t3.c2. If the database management system 150 does not find a record in the table t3 that satisfies the predicates 455 for the intermediate result set returned from the join node 415, then the database management system 150 returns to the join node 415 and re-performs the join 415, retrieving the next record from the table t1 and finding a record in the table t2 that satisfies the predicate 460 before returning to the join node 410 and once again searching for a third record in the table t3 that meets the predicates 455.

Once the database management system 150 has found a third record in the table t3 that satisfies the criteria of the predicates 455, the database management system 150 returns the intermediate result set of the first record from the table t1, the second record from the table t2, and the third record from the table t3 that meets the criteria of the predicates 455 and 460 to the join node 405.

The database management system 150 then travels to the right child node 435 of the join node 405, encounters (reads) the table node 435 and searches for a fourth record in the table t4 identified by the table node 435 that satisfies the criteria of the predicates 450 and 465 while using the records in the intermediate result set to perform the comparison of the predicates 450 and 465.

The database management system 150 scans all records in the table t4, and then processing of the database management system 150 returns back to the join node 410, which ensures that all records in the table t3 are scanned for the current records retrieved from the tables t1 and t2. Once all records in the table t3 are scanned and any matches are processed further by the database management system 150 at the join node 405, the database management system 150 returns to the join node 415, retrieves the next record from the table t1, and repeats the aforementioned sequence of operations.

Thus, the table node 420 representing the table t1 235-1 is the first table in the join order of the execution plan 225-1 because the database management system 150 scans records from the table t1 235-1 prior to reading records from any of the other tables (represented by the nodes 425, 430, and 435) in the join order. The table t2 235-2 represented by the node 425 is second in the join order because the database management system 150 reads records from the table t2 235-2 after reading records from the table t1 in order to determine if the predicates 460 are satisfied and prior to reading records from the table t3 and t4, represented by the respective nodes 430 and 435. The table t3 235-3 represented by the node 430 is third in the join order because the database management system 150 reads records from the table t3 235-3 after reading records from the table t1 and t2, in order to determine if the predicates 455 are satisfied and prior to reading records from the table t4. The table t4 235-4 represented by the node 435 is fourth, or last, in the join order because the database management system 150 reads records from the table t4 235-4 last after reading records from the tables t1, t2, and t3, in order to determine if the predicates 450 and 465 are satisfied.

A tree graph, with parent and child nodes, is merely a logical representation of a query execution, which aids in understanding how the execution engine 230 executes a particular query. But, the execution plan 225 generated by the optimizer 215 often comprises proprietary code understandable and executable by the execution engine 230. This code does not specifically require parent nodes and child nodes but, instead, comprises logic that is represented by a tree graph model having such nodes and connections and can be implemented as other types of data structures as well. Accordingly, while embodiments of the present invention are more easily understood by referring to tree graph terminology, and, thus, have been described herein using such terminology, these embodiments do not require actual creation and modification of a tree graph.

Figure 5:
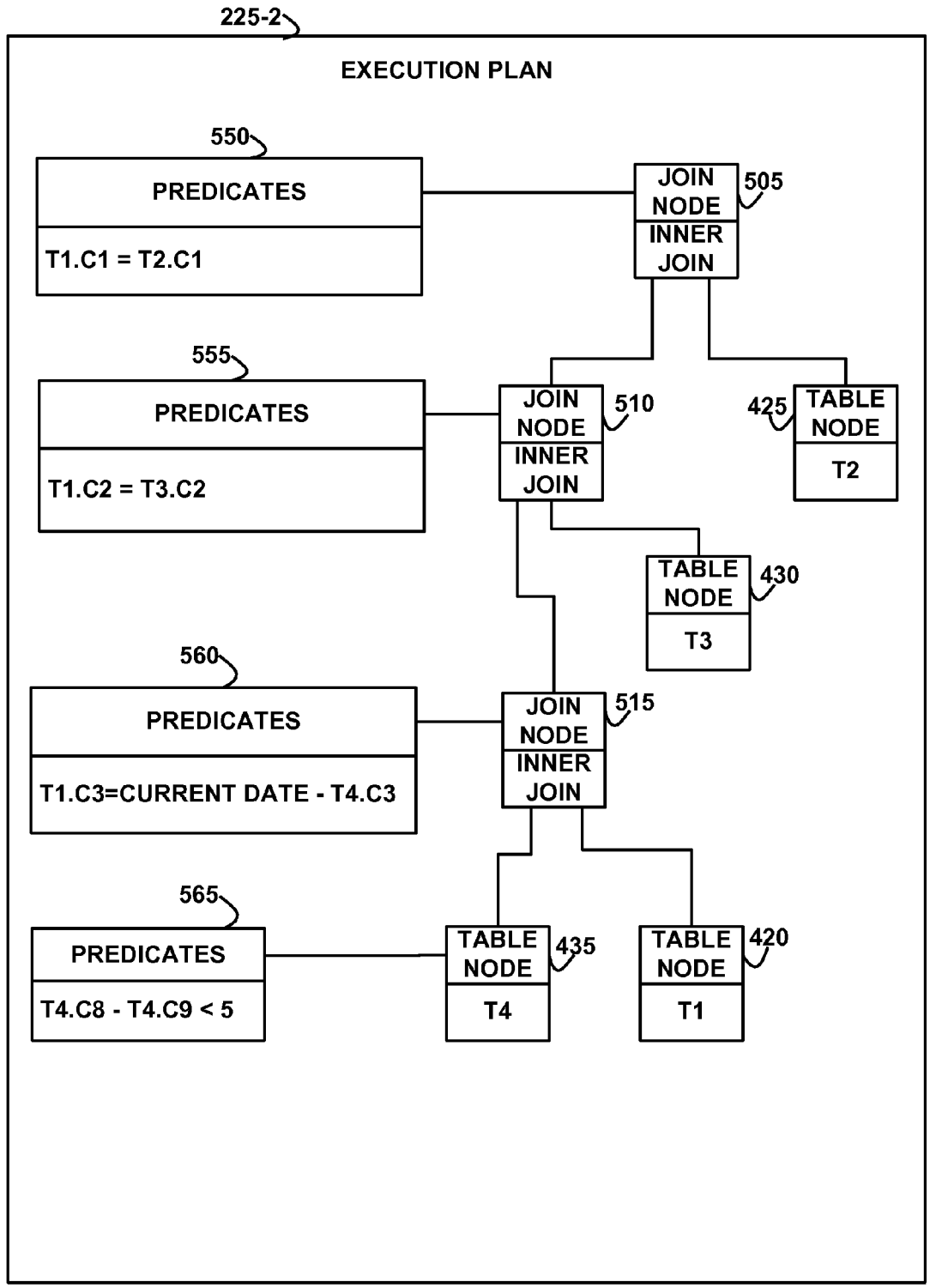
FIG. 5 depicts a block diagram of another example execution plan for the first query with a forced primary join order, according to an embodiment of the invention.

FIG. 5 depicts a block diagram of an example execution plan 225-2 that implements a query using a forced primary join order, according to an embodiment of the invention. The database management system 150 has modified the execution plan 225-2 from the execution plan 225-1 (FIG. 4) to move (force) the table node t4 435 to be the first (left-most or primary) table node in the join order of the execution plan 225-2.

The example execution plan 225-2 comprises a tree graph, which is a data structure that represents the join operation that implements the query. In this example, the query that the execution plan 225-1 implements is the same as the query implemented by the execution plan 225-1 (FIG. 4).

The tree graph of the execution plan 225-2 comprises join nodes 505, 510, and 515; table nodes 420, 425, 430, and 435; and predicate nodes 550, 555, 560, and 565. The table node 420 represents the table 235-1. The table node 425 represents the table 235-2. The table node 430 represents the table 235-3. The table node 435 represents the table 235-4.

Each of the predicate nodes is associated with or connected to one of the join nodes. The predicates 550, 555, 560, and 565 each represent a portion of the query and comprise respective conditional criteria expressions, which the database management system 150 evaluates to either true or false by substituting data from the records retrieved from the table nodes (child nodes of the connected join nodes) into variables or placeholders in the expression that match (are the same as or identical to) column identifiers in the records.

The join node 515 represents a join operation of the tables represented by the child table nodes 435 and 420 using the connected predicates 565.

The join node 510 represents a join operation of the tables represented by the child table node 430 and an intermediate result set created by the child join node 515, using the predicates 555.

The join node 505 represents a join operation of the table represented by the child table node 425 and an intermediate result set created by the child join node 510, using the predicates 550.

The database management system 150 executes the query using the execution plan 225-2, in an operation analogous to that described above for the execution plan 225-1, but with a different join order where the table node 435 representing the table t4 235-4 is the first table in the join order because the database management system 150 scans records from the table t4 235-4 prior to reading records from any of the other tables; the table t1 235-1 represented by the node 420 is second in the join order because the database management system 150 reads records from the table t1 235-1 after reading records from the table t4, in order to determine if the predicates 560 and 565 are satisfied and prior to reading records from the table t3 and t2. The table t3 235-3 represented by the node 430 is third in the join order because the database management system 150 reads records from the table t3 235-3 after reading records from the table t4 and t1, in order to determine if the predicate is 555 are satisfied and prior to reading records from the table t2. The table t2 235-2 represented by the node 425 is fourth, or last, in the join order because the database management system 150 reads records from the table t2 235-2 last after reading records from the tables t4, t1, and t3, in order to determine if the predicates 550 are satisfied.

Figure 6:
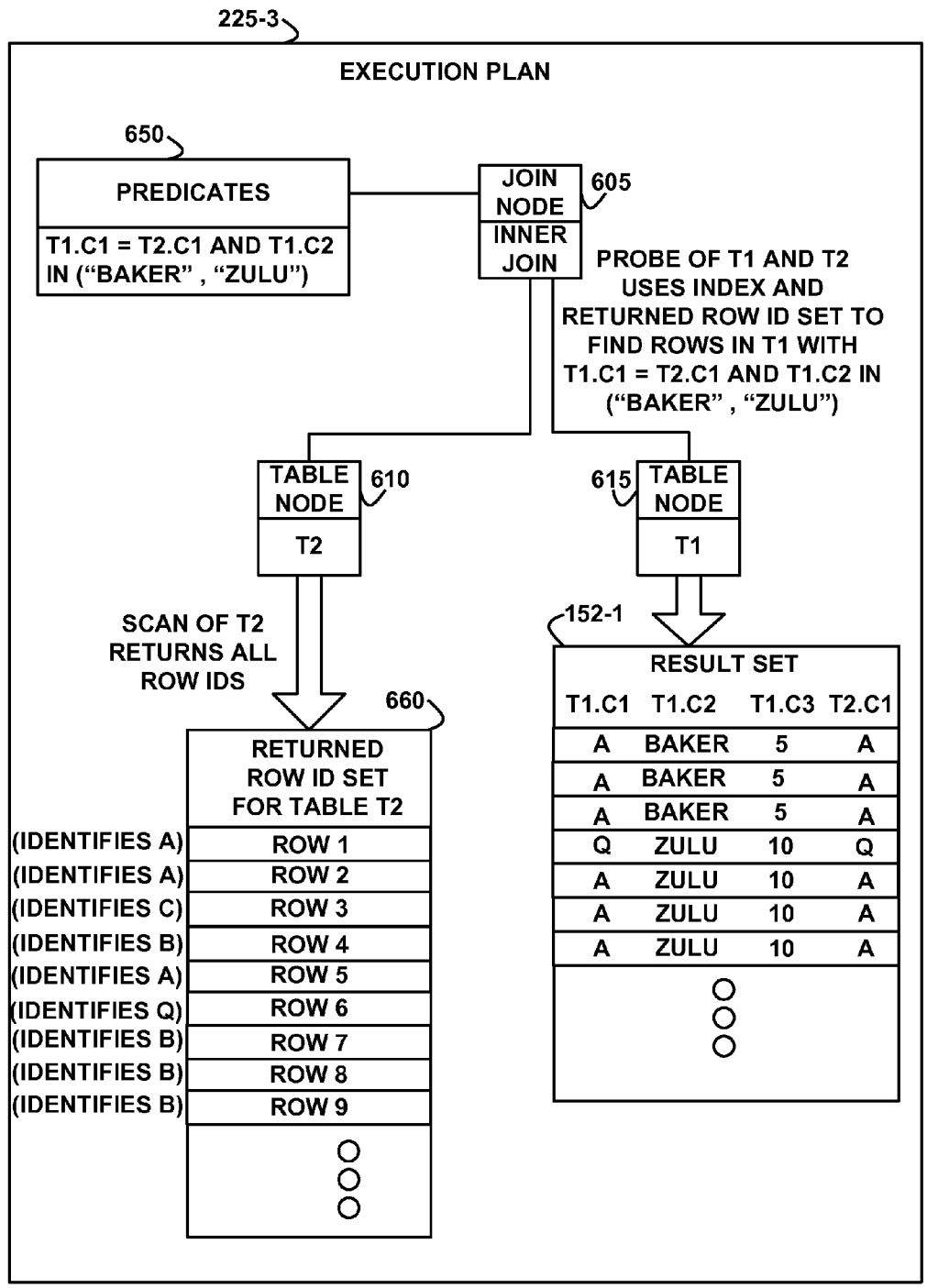
FIG. 6 depicts a block diagram of an example execution plan for a second query with an original join order, according to an embodiment of the invention.

FIG. 6 depicts a block diagram of an example execution plan 225-3 that implements a query with an original join order, according to an embodiment of the invention.

The example execution plan 225-3 comprises a tree graph, which is a data structure that represents the join operation that implements a query. In this example, the query, which the execution plan 225-3 implements may be represented as: "select * from t1, t2 where t1.c2 in ("BAKER", "ZULU") and t1.c1=t2.c1."

The tree graph of the execution plan 225-3 illustrates one example implementation and one example join order for the example query, but other implementations and join orders for this query also exist. The tree graph of the execution plan 225-3 comprises the join node 605; the table nodes 610 and 615; and the predicates 650. The table node 610 represents the table t2 235-2. The table node 615 represents the table t1 235-1. The predicate 650 is connected to the join node 605. The join node 605 represents a join operation of the tables represented by the child table nodes 610 and 615 using the predicates 650.

In operation, the database management system 150 executes the query using the execution plan 225-3 as follows. The database management system 150 begins traversing the nodes and encounters (reads) the head join node 605. Since the join node 605 is not a table node, the database management system 150 reads the predicates 650 and travels to left child node 610 of the join node 605, in search of records that satisfy the predicates 650. The database management system 150 encounters (reads) the table node 610. Since the join node 610 is a table node, the database management system 150 retrieves the records from the table represented by the table node 610, using a scan operation, that satisfy the predicates 650 and returns the row identifiers that represent the scanned records to the join node 605 in the returned row identifier set 660. Scan operations read records from the beginning to the end of a table, i.e., non-randomly, without using the index 240 to randomly access the table. In the illustrated example, the database management system 150 scans the table t2 and returns the returned row identifier set 660 with row identifiers from the table t2 that contain all values in the column c1 because the predicates 650 do not restrict the values in t2.c1 until rows from table t1 have also been read.

The database management system 150 then travels to the right child node of the join node 605, encounters the table node 615 and uses the index 240 to find rows in the table t1 that contain t1.c1 values that equal the t2.c1 values in rows identified by the returned row identifier set 660 where t1.c2 is a member of ("BAKER", "ZULU"), i.e., those t1.c1 and t2.c1 values that satisfy the predicates 650. The database management system 150 finds the rows via probe operations that directly and randomly access the table t2 via the row identifiers of the returned row identifier set 660, that submit the key t1.c2 and the key values ("BAKER", "ZULU") to the index 240, and that submit the t1.c1 key and the t2.c1 values as key values (in order to find the rows that satisfy the "t1.c1=t2.c1" predicate) to the index.

Thus, execution of the execution plan 225-3 results in the result set 152-1, which includes the joined values of rows from t1.c1, t1.c2, t1.c3, and t2.c1. The execution of the execution plan 225-3 causes the result set 152-1 to include duplicate rows because each row in t1.c1 with a value of "A" matches (contains the same or identical value as) three rows in t2.c1. The result set 152-2 is an example of the result set 152 (FIG. 1).

Notice that the join operation eliminates records from the result set when it performs its operations against the table node 615, i.e., the returned row identifier set 660 identifies more rows than are included in the result set 152-1.

Figure 7:
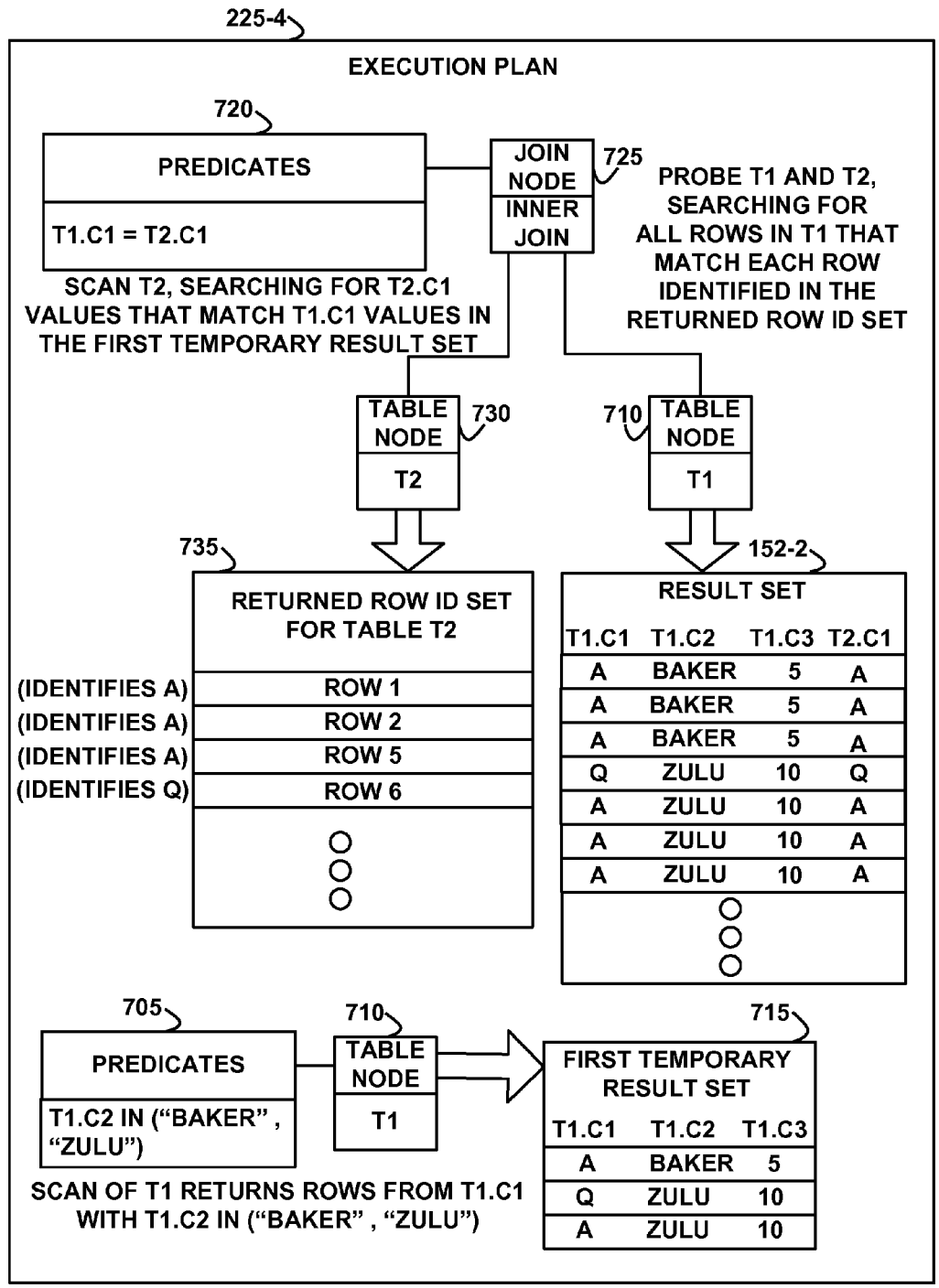
FIG. 7 depicts a block diagram of another example execution plan for the second query with a star join order and pre-selection, according to an embodiment of the invention.

FIG. 7 depicts a block diagram of another example execution plan 225-4 that implements a query using a star join order with pre-selection, according to an embodiment of the invention. The execution plan 225-4 implements the same example query as does the execution plan 225-3.

In a star join, one or more dimension tables are joined to a fact table. The tree in a star join schematically resembles a star, and is named as such due to the dimension tables appearing as points of a star surrounding the central fact table, in a graphical representation of the tree.

In an embodiment, the dimension tables comprise a simple primary key, while the fact tables comprise a compound primary key consisting of the aggregate of relevant dimension keys. A primary key (also called a unique key) uniquely identifies each row in a table. A simple primary key comprises a single column in the table and is unique, meaning that no two distinct rows in the table can have the same value in that column. A compound key is a key that consists of two or more columns that uniquely identify a row where each column (attribute) that makes up the compound key is a simple primary key in its own right. A compound key is distinguished from a composite key, which is a key that comprises two or more columns (attributes) that uniquely identify a row where at least one column (attribute) that makes up the composite key is not a simple primary key. In another embodiment, the table that returns the most number rows (in response to the query) and has little or no local selection is the fact table, and the table(s) that return less than the most number of rows (in response to the query) and have local selection are the dimension table(s).

In the example of FIG. 7, the table node 710 (representing the table T1), represents the dimension table and has local selection, meaning that the predicates 705 specify and select only on values in the columns in the table node 710 representing the table t1 and do not specify columns in any other table. The table node 730 (representing the table T2) represents the fact table, which does not have local selection because the predicates 720, which the join node 725 uses to select from the table T2 represented by the table node 730, specify columns in more than one table (in both tables t1 and t2).

In operation, the database management system 150 executes the query using the execution plan 225-4 as follows. First, the database management system 150 performs pre-selection by reading the predicates 705 that are connected to the table 710, and in response, scans the table T1, returning rows from t1.c1 that satisfy the predicates 705 (i.e., the rows from table T1 with t1.c2 in ("BAKER", "ZULU")), which yields the first temporary result set 715, which comprises the values of t1.c1, t1.c2, and t1.c3 that are in rows whose t1.c2 values are either "BAKER" or "ZULU."

The database management system 150 then reads the tree, starting at the head node (the join node 725). In response to reading the head node 725, the database management system 150 reads the connected predicates 720 and travels to the left child node of the join node, encountering and reading the table node 730. In response to reading the table node 730, the database management system 150 scans the table t2, searching for t1.c1 and t2.c1 values that satisfy the predicates 720 (i.e., searching for t2.c1 values that match t1.c1 values that are in the first temporary result set 715), yielding the returned row identifier set 735, which includes row identifiers of rows in the table t2, whose t2.c1 values satisfy the predicates 720.

The database management system 150 returns the returned row identifier set 735 to the join node 725, and in response, travels to the right child node 710 and reads the right child node 710. In response, the database management system 150 then probes the tables t1 and t2, searching for all rows in table t1 where the t1.c1 value equals the t2.c1 value in the rows that are identified by the returned row identifier set 735, yielding the result set 152-2, which is an example of the result set 152 (FIG. 1). The database management system 150 reads a row identifier from the returned row identifier set 735, accesses the row in the table t2 directly by the identifier, reads the value of t2.c1 in the accessed row, and submits the read value as a key value along with the key t1.c1 to the index 240, in order to retrieve a row or rows in t1 that contain a value in t1.c2 that matches the value from t2.c1. The database management system 150 then saves the values of t1.c1, t1.c2, t1.c3, and t2.c1 to the result set 152-2. The database management system 150 repeats these probe operations for each row identifier in the returned row identifier set 735.

In a probe operation, the database management system 150 retrieves a record from a table via a random access operation using the index 240 and a key or column value into the index to directly retrieve the indexed record from the table, without needing to scan the table from beginning to end.

Thus, the database management system 150 performs the scan of the table T1 identified by the table node 710 to create the first temporary result set 715 prior to scanning the table t2 identified by the table node 730, even though the table node 730 is specified first in the join order of the tree and the table node 710 is specified last in the join order of the tree, hence the designation of "pre-selection."

Figure 8:
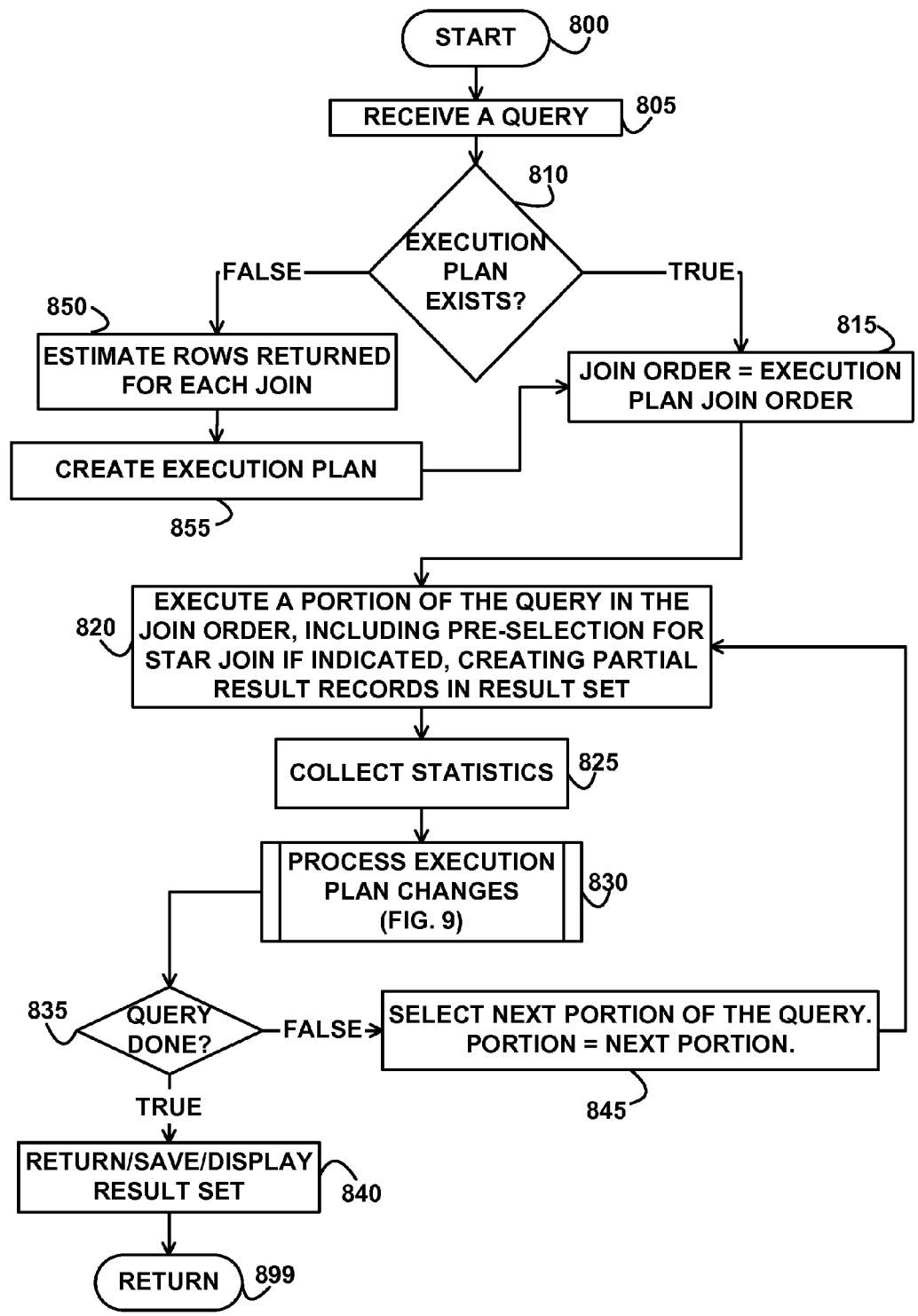
FIG. 8 depicts a flowchart of example processing for processing a query, according to an embodiment of the invention.

FIG. 8 depicts a flowchart of example processing for processing a query, according to an embodiment of the invention. Control begins at block 800. Control then continues to block 805 where the application 160 sends a query and the database management system 150 receives the query. Control then continues to block 810 where the database management system 150 determines whether an execution plan 225 already exists that implements the query. If the determination at block 810 is true, then an execution plan 225 already exists that was previously created that implements the query, so control continues to block 815 where the database management system 150 sets the join order for the query to be the already existing join order indicated by the execution plan 225.

Control then continues to block 820 where the database management system 150 executes a portion of the query 158 in the join order, including pre-selection for star join if such is indicated by the execution plan 225, as previously described above with reference to FIG. 7. The database management system 150 stores records in the result set 152 that results from the execution of the portion of the execution plan 225. In an embodiment, the database management system 150 selects a portion of the query 158 by selecting a certain number or percentage of the records (which is less than the total number or percentage of records) to scan from the first table in the join order. During every execution of the loop that starts at block 820, the database management system 150 scans a different portion of the records from the first table in the join order.

Control then continues to block 825 where the database management system 150 collects statistics related to the join operation, such as the number of rows that are eliminated, discarded, or not-selected from the result set 152 by the join operation (also called fan-in) for reach table and the number of rows that are returned to the result set 152 by the join operation (also called fan-out).

The database management system 150 later uses these collected statistics to change the join order for the query 158.

Consider the following example. One join operation may have a high fan-out rate in which each record of table A matches multiple records in table B. If this join is performed first, then each of these matching records need to be later joined to another table C, thereby requiring a number of intermediate operations. Conversely, the join operation may have a high fan-in rate, in which each record of table A matches few records in table C. If this join operation is performed first, then only a few records need be joined with table B, thereby saving a number of intermediate operations.

Control then continues to block 830 where the database management system 150 processes execution plan changes, as further described below with reference to FIG. 9. Control then continues to block 835 where the database management system 150 determines whether the execution of the query 158 is done. That is, the database management system 150 determines whether the loop that starts at block 820 has traversed the entire tree in the execution plan 225 and has found every record in every table that satisfies the predicates.

If the determination at block 835 is true, then the query 158 is done, i.e., the loop that starts at block 820 has traversed the entire tree in the execution plan 225 and has found every record in every table that satisfies the predicates, so control continues to block 840 where the database management system 150 returns the result set 152 to the application 160, saves the result set 152 in memory or a storage device, or presents the result set 152 via the user terminal, e.g., by displaying the result set 152 or a portion of the result set 152 via a video display device. Control then continues to block 899 where the logic of FIG. 8 returns.

If the determination at block 835 is false, then the query 158 is not done, i.e., the loop that starts at block 820 has not yet traversed the entire tree in the execution plan 225 and has not yet examined, read, or processed every record in every table that could satisfy the predicates, so control continues to block 845 where the database management system 150 selects the next portion of the query 158 to execute. That is, the database management system 150 selects the next portion or quantity of records from the first table in the join order. Control then returns to block 820 where the database management system 150 begins executing the next portion of the query 158, as previously described above.

If the determination at block 810 is false then an execution plan 225 does not already exist that implements the query 158, so control continues to block 850 where the database management system 150 estimates the number of rows that each join operation (represented by each join node in the tree in the execution plan 225) returns when executed. In an embodiment, the estimated number of rows is equal to the sum of the number of rows in each table of the join. In other embodiments, any appropriate estimate may be used.

Control then continues to block 855 where the database management system 150 creates and stores the execution plan 225 that implements the received query 158. The execution plan 225 comprises a tree representing joins, predicates, and a join order, as previously described above with reference to FIGS. 4 and 6. In an embodiment, the database management system 150 creates the join order in the execution plan 225 to be the order of the tables from the smallest number of estimated rows returned by each table to the largest estimated number of rows returned by each table. In various other embodiments, the database management system 150 creates the join order in the execution plan 225 via the KBZ algorithm (Krishanmurthy, Boral, and Zaniolo), via a Greedy algorithm, or via any other appropriate algorithm for selecting a join order.

Control then continues to block 815 where the database management system 150 sets the join order to be used by execution of the query 158 to be the join order that is specified by the execution plan 225. Control then continues to block 820, as previously described above.

Figure 9:
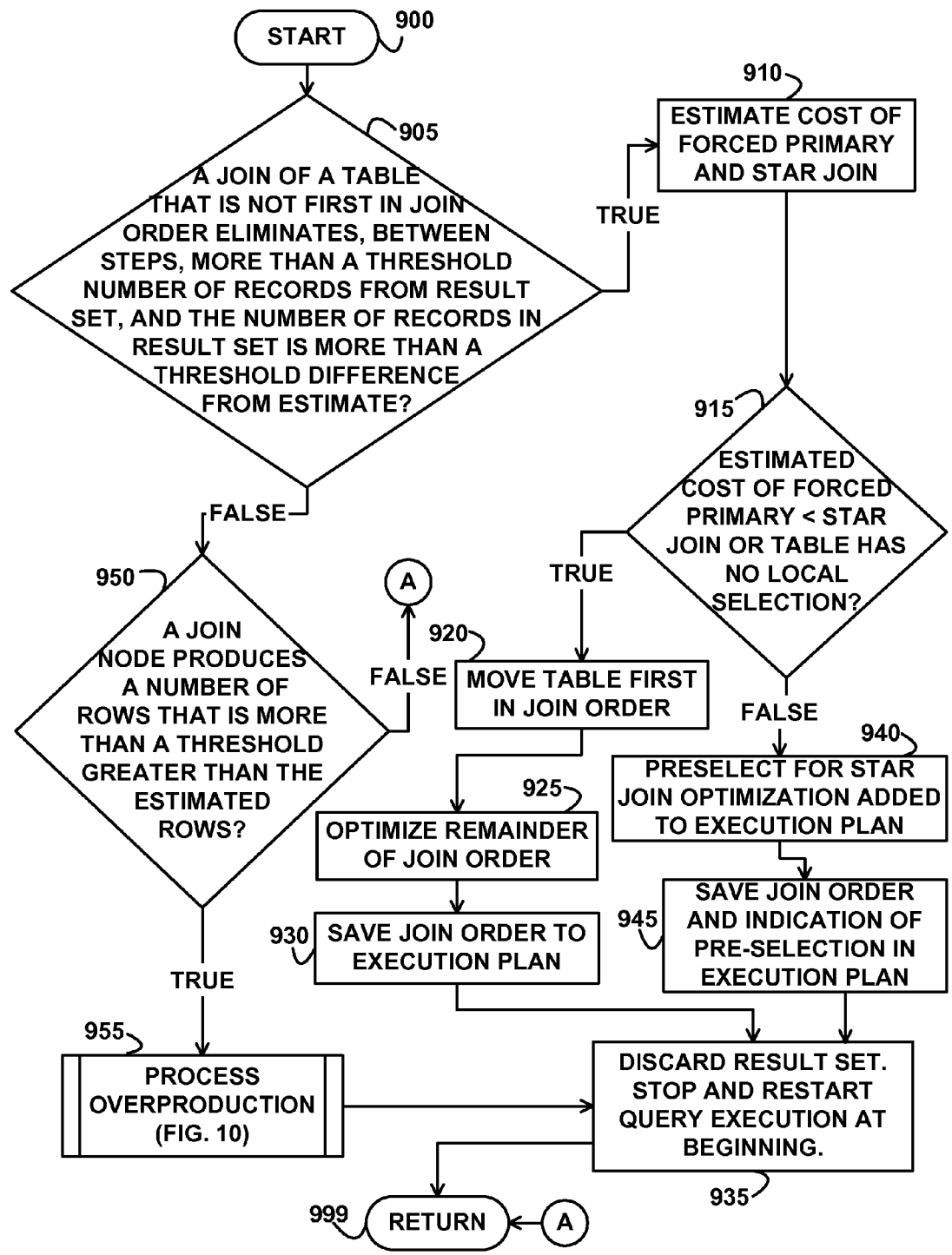
FIG. 9 depicts a flowchart of example processing for execution plan changes, according to an embodiment of the invention.

FIG. 9 depicts a flowchart of example processing for changes to the execution plan, according to an embodiment of the invention. Control begins at block 900. Control then continues to block 905 where the database management system 150 determines whether a join of a table that is not first in the join order eliminates, between join steps or nodes, more than a threshold number of records from the result set 152 and the number of records that remain in the result set 152 is more than a threshold difference from the estimated number of records that remain in the result set 152. That is, prior to performing a join operation, the database management system 150 estimates the number of records that the join operation will eliminate from the result set 152 when performed and estimates the number of records that will remain in the result set 152 after the join operation is performed. If the actual number of records eliminated (when the join operation is performed) is significantly different (more than a threshold different) from the estimated number of records eliminated and the actual number of records that remain in the result set 152 (after the join is performed) is significantly different (more than a threshold difference) from an estimated number of records that remain in the result set 152, then the determination of block 905 is true. A join operation eliminates records by removing or deleting records from the result set 152 that do not satisfy the predicate that is connected to the join node that represents the join operation.

Using the example of FIG. 6, if the rows 1 through 9 in the returned row identifier set 660 represent rows returned by a portion of the query (executed by the loop that starts at block 820 of FIG. 8) and the result set 152-1 represents a partial result set created by the portion of the query, then the join (represented by the join node 605) of the table t1 (represented by the table node 615, which is not first in the join order) eliminated two records from the partial result set 152-1 because the partial result set 152-1 includes seven records while the returned result identifier set 660 identifies nine records (9−7=2). Thus, if the number of records eliminated (2) is more than a threshold number of records and the number of records in the partial result set (seven records) is more than a threshold difference from an estimated number of records in the partial result set, then the determination of block 905 is true.

If the determination at block 905 is true, then a join of a table that is not first in the join order eliminates, between join steps or nodes, more than a threshold number of records from the result set 152 and the number of records in the result set 152 is more than a threshold difference from the estimated number of records eliminated from the result set 152, so control continues to block 910 where the database management system 150 estimates the costs of performing the query 158 using a prospective execution plan that comprises a forced primary join and using a prospective execution plan that comprises a star join with pre-selection. The forced primary join was previously described above with reference to FIG. 5. The star join with pre-selection was previously described above with reference to FIG. 7. In various embodiments, the database management system 150 estimates the estimated costs for each execution plan 225 to be the estimated number of scans of the tables, the estimated number of probes of the tables, the estimated amount of memory used by each prospective execution plan 225, the estimated amount of time needed to perform each prospective execution plan, the estimated number of rows that added to the result set 152 (or any temporary or intermediate result set) by join operations, but then are deleted from the result set 152 by a subsequent join operation during execution of each prospective execution plan, or any combination thereof.

Control then continues to block 915 where the database management system 150 determines whether the estimated cost of performing the query 158 using a prospective execution plan that comprises a forced primary join is less than the estimated cost of performing the query 158 using a prospective execution plan that comprises a star join with pre-selection or the table (selected at block 905) has no local selection.

If the determination at block 915 is true, then the estimated cost of performing the query 158 using a prospective execution plan that comprises a forced primary join is less than the estimated cost of performing the query 158 using a prospective execution plan that comprises a star join with pre-selection or the table (selected at block 905) has no local selection, so control continues to block 920 where the database management system 150 moves the table that was found by the determination of block 905 to be first in the join order in the execution plan 225. That, is the database management system 150 modifies the previous execution plan into a new execution plan that implements a forced primary join.

Control then continues to block 925 where the database management system 150 optimizes the remainder of the join order (other than the table that is now first in the join order) using a join order optimization technique. An example of a join order optimization technique is to estimate the number of rows returned for each table and then order the tables in the join by increasing estimated number of rows returned, with the table that has the lowest estimated number of rows being first and the table with the largest estimated number of rows being last in the join order. An example way to estimate the number of rows returned is to calculate the cardinality of the table, i.e., the number of rows in the table. But, in other embodiments, any appropriate join order optimization technique may be used.

Control then continues to block 930 where the database management system 150 saves the new join order to the new execution plan. Control then continues to block 935 where the database management system 150 discards the result set 152, stops the query execution, and restarts the query execution from the beginning, meaning that the loop that starts at block 820 in FIG. 8 once again begins executing a portion of the query in the new join order via the new execution plan, starting by scanning a first portion of the records in the new first table in the new join order. Since the new join order in the new execution plan is different, in an embodiment, the partial result set created by the re-execution is also different from the partial result set previously created. Control then continues to block 999 where the logic of FIG. 9 returns.

If the determination at block 915 is false, then the estimated cost of performing the query 158 using a prospective execution plan that comprises a forced primary join is not less than the estimated cost of performing the query 158 using a prospective execution plan that comprises a star join with pre-selection and the table (selected at block 905) has local selection, so control continues to block 940 where the database management system 150 modifies the current execution plan into a new execution plan that implements star join optimization with pre-selection, as previously described above with reference to FIG. 7.

The database management system creates the new execution plan with star join optimization and pre-selection by selecting the table that was previously found at block 905, designating that table as a dimension table in the star join, with its connected predicates set to the local selection predicates specified by the query and by modifying the subsequent probes of that table to access that table using the temporary result set created by the pre-selection, as previously described above with reference to FIG. 7.

Control then continues to block 945 where the database management system 150 saves the join order and an indication of a star join with pre-selection into the new execution plan. Control then continues to block 935 where the database management system 150 discards the partial result set, stops the query execution, and restarts the query execution from the beginning, using the new execution plan. Control then continues to block 999 where the logic of FIG. 9 returns.

If the determination at block 905 is false, then a join of a table that is not first in the join order does not eliminate more than a threshold number of records from the result set 152 or the number of records in the result set 152 is not more than a threshold difference from the estimated number of records in the result set 152, so control continues to block 950 where the database management system 150 determines whether execution of a join operation represented by a join node in the tree produces a number of rows that is more than a threshold value greater than the estimated number of rows produced by the join node.

If the determination at block 950 is true, then the database management system 150 found a join node that produces a number of rows that is more than a threshold value greater than the estimated number of rows produced by the join node, so control continues to block 955 where the database management system 150 processes the overproduction of records returned by the join node, as further described below with reference to FIG. 10.

Control then continues to block 935 where the database management system 150 discards the result set 152, stops the query execution, and restarts the query execution from the beginning. Control then continues to block 999 where the logic of FIG. 9 returns.

If the determination at block 950 is false, then the database management system 150 did not find a join node that produces a number of rows that is more than a threshold value greater than the estimated number of rows produced by the join node, so control continues to block 999 where the logic of FIG. 9 returns. The query execution is thus not stopped and the result set 152 is not discarded, so that the execution of the query continues to the next step of the join, keeping the partial result set that has been thus far produced.

Figure 10:
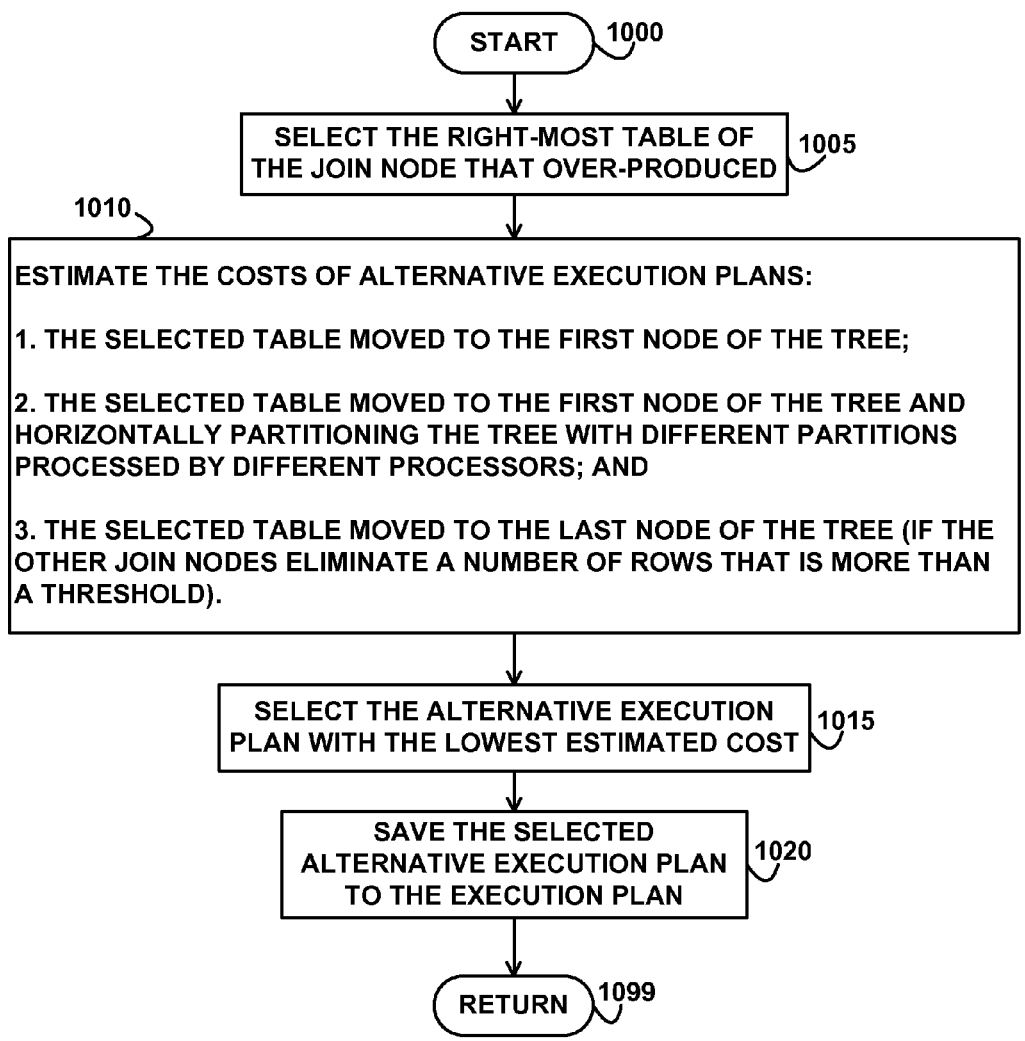
FIG. 10 depicts a flowchart of example processing for overproduction, according to an embodiment of the invention.

FIG. 10 depicts a flowchart of example processing for overproduction, according to an embodiment of the invention. Control begins at block 1000. Control then continues to block 1005 where the database management system 150 selects the right-most (last in the join order) child table of the join node that was determined to have over-produced rows by the processing of block 950.

Control then continues to block 1010 where the database management system 150 estimates the costs of the following alternative execution plans:

1. An execution plan with the selected table moved to the first node (in the join order) of the tree;

2. An execution plan with the selected table moved to the first node (in the join order) of the tree and the selected table is horizontally partitioned with the join of different rows in different partitions being processed by different processors; and 3. An execution plan with the selected table moved to the last node (in the join order) of the tree (if the other join nodes eliminate a number of rows from the result set 152 that is more than a threshold).

In various embodiments, the cost of an execution plan 225 comprises the processing time and/or the amount of memory needed to execute the query 158 using the execution plan 225.

Control then continues to block 1015 where the database management system 150 selects the alternative execution plan that has the lowest estimated cost. Control then continues to block 1020 where the database management system 150 saves the selected alternative execution plan to the execution plan. Control then continues to block 1099 where the logic of FIG. 10 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
executing a portion of an execution plan to produce a portion of records in a partial result set;
if the executing the portion of the execution plan performs a first join of a table that eliminates more than a first threshold number of records from the partial result set, determining whether an estimated cost of forced primary is less than an estimated cost of a star join;
if the estimated cost of the forced primary is less than the estimated cost of the star join, moving the table first in a join order in the execution plan, discarding the portion of the records in the partial result set, and re-starting the executing with a different portion of the execution plan to produce a different portion of the records; and
if the estimated cost of the forced primary is not less than the estimated cost of the star join and the table that eliminates more than the first threshold of records from the partial result set is not first in the join order and has local selection, modifying the execution plan for star join pre-selection, wherein the modifying the execution plan for star join pre-selection further comprises specifying a scan of the table that eliminates more than the first threshold of records from the partial result set that is not first in the join order and has local selection to produce a temporary result set prior to a scan of a table that is first in the join order.

2. The method of claim 1, further comprising:
if the executing the portion of the execution plan does not perform the first join of the table that eliminates more than the first threshold number of records from the partial result set, determining whether a second join of a second table produces a number of rows that is greater than an estimated number of rows.

3. The method of claim 2, further comprising:
if the second join does not produce the number of rows that is greater than the estimated number of rows, continuing the executing the execution plan to another portion and keeping the partial result set.

4. The method of claim 2, further comprising:
if the second join of the second table produces the number of rows that is greater than the estimated number of rows, estimating a plurality of respective costs for a first alternative execution plan comprising the second table is moved to a first node in the join order of the first alternative execution plan, a second alternative execution plan comprising the second table is moved to the first node of the join order of the second alternative execution plan and horizontally partitioning the second table for different rows in the second table processed by different processors, and a third alternative execution plan comprising the second table is moved to a last node in the join order of the third alternative execution plan.

5. The method of claim 4, further comprising:
saving the first alternative execution plan to the execution plan if the first alternative execution plan has a lowest of the plurality of respective costs;
saving the second alternative execution plan to the execution plan if the second alternative execution plan has the lowest of the plurality of respective costs; and
saving the third alternative execution plan to the execution plan if the third alternative execution plan has the lowest of the plurality of respective costs.

6. A non-transitory computer-readable storage medium comprising:
executing a portion of an execution plan to produce a portion of records in a partial result set;
if the executing the portion of the execution plan performs a first join of a table that eliminates more than a first threshold number of records from the partial result set, determining whether an estimated cost of forced primary is less than an estimated cost of a star join;
if the estimated cost of the forced primary is less than the estimated cost of the star join, moving the table first in a join order in the execution plan, discarding the portion of the records in the partial result set, and re-starting the executing with a different portion of the execution plan to produce a different portion of the records; and
if the estimated cost of the forced primary is not less than the estimated cost of the star join and the table that eliminates more than the first threshold of records from the partial result set is not first in the join order and has local selection, modifying the execution plan for star join pre-selection, wherein the modifying the execution plan for star join pre-selection further comprises specifying a scan of the table that eliminates more than the first threshold of records from the partial result set that is not first in the join order and has local selection to produce a temporary result set prior to a scan of a table that is first in the join order.

7. The computer-readable storage medium of claim 6, further comprising:
if the executing the portion of the execution plan does not perform the first join of the table that eliminates more than the first threshold number of records from the partial result set, determining whether a second join of a second table produces a number of rows that is greater than an estimated number of rows.

8. The computer-readable storage medium of claim 7, further comprising:
if the second join does not produce the number of rows that is greater than the estimated number of rows, continuing the executing the execution plan to another portion and keeping the partial result set.

9. The computer-readable storage medium of claim 7, further comprising:
if the second join of the second table produces the number of rows that is greater than the estimated number of rows, estimating a plurality of respective costs for a first alternative execution plan comprising the second table is moved to a first node in the join order of the first alternative execution plan, a second alternative execution plan comprising the second table is moved to the first node of the join order of the second alternative execution plan and horizontally partitioning the second table for different rows in the second table processed by different processors, and a third alternative execution plan comprising the second table is moved to a last node in the join order of the third alternative execution plan.

10. The computer-readable storage medium of claim 9, further comprising:
saving the first alternative execution plan to the execution plan if the first alternative execution plan has a lowest of the plurality of respective costs;
saving the second alternative execution plan to the execution plan if the second alternative execution plan has the lowest of the plurality of respective costs; and
saving the third alternative execution plan to the execution plan if the third alternative execution plan has the lowest of the plurality of respective costs.

11. A computer system comprising:
a processor; and
memory communicatively connected to the processor, wherein the memory is encoded with instructions and wherein the instructions when executed comprise
executing a portion of an execution plan to produce a portion of records in a partial result set,
if the executing the portion of the execution plan performs a first join of a table that eliminates more than a first threshold number of records from the partial result set, determining whether an estimated cost of forced primary is less than an estimated cost of a star join,
if the estimated cost of the forced primary is less than the estimated cost of the star join, moving the table first in a join order in the execution plan, discarding the portion of the records in the partial result set, and restarting the executing with a different portion of the execution plan to produce a different portion of the records, and
if the estimated cost of the forced primary is not less than the estimated cost of the star join and the table that eliminates more than the first threshold of records from the partial result set is not first in the join order and has local selection, modifying the execution plan for star join pre-selection, wherein the modifying the execution plan for star join pre-selection further comprises specifying a scan of the table that eliminates more than the first threshold of records from the partial result set that is not first in the join order and has local selection to produce a temporary result set prior to a scan of a table that is first in the join order.

12. The computer system of claim 11, wherein the modifying the execution plan for star join pre-selection further comprises:
specifying the probing of the table that eliminates more than the first threshold of records from the partial result set that is not first in the join order and has local selection via row identifiers in the temporary result set.

13. The computer system of claim 11, wherein the instructions further comprise:
if the executing the portion of the execution plan performs a first join of a table that eliminates more than the first threshold number of records from the partial result set and a number of records in the partial result set is more than a threshold difference from an estimated number of records in the partial result set, determining whether an estimated cost of forced primary is less than an estimated cost of a star join.

14. The computer system of claim 11, wherein the instructions further comprise:
if the executing the portion of the execution plan does not perform the first join of the table that eliminates more than the first threshold number of records from the partial result set, determining whether a second join of a second table produces a number of rows that is greater than an estimated number of rows.

15. The computer system of claim 11, wherein the instructions further comprise:
if the second join does not produce the number of rows that is greater than the estimated number of rows, continuing the executing the execution plan to another portion and keeping the partial result set.

16. The computer system of claim 11, wherein the instructions further comprise:
if the second join of the second table produces the number of rows that is greater than the estimated number of rows, estimating a plurality of respective costs for a first alternative execution plan comprising the second table is moved to a first node in the join order of the first alternative execution plan, a second alternative execution plan comprising the second table is moved to the first node of the join order of the second alternative execution plan and horizontally partitioning the second table for different rows in the second table processed by different processors, and a third alternative execution plan comprising the second table is moved to a last node in the join order of the third alternative execution plan.

17. The computer system of claim 16, wherein the instructions further comprise:
saving the first alternative execution plan to the execution plan if the first alternative execution plan has a lowest of the plurality of respective costs;
saving the second alternative execution plan to the execution plan if the second alternative execution plan has the lowest of the plurality of respective costs; and
saving the third alternative execution plan to the execution plan if the third alternative execution plan has the lowest of the plurality of respective costs.

* * * * *